United States Patent
Webb et al.

[11] Patent Number: 6,143,839
[45] Date of Patent: Nov. 7, 2000

[54] WEATHERABLE BLENDS OF POLYCARBONATES WITH ARYLATE POLYMERS

[75] Inventors: Jimmy Lynn Webb, Ballston Lake; Randall Lee Carter, Clifton Park; Tiberiu Mircea Siclovan; James Edward Pickett, both of Schenectady, all of N.Y.

[73] Assignee: General Electric Company, Schenectady, N.Y.

[21] Appl. No.: 09/152,877

[22] Filed: Sep. 14, 1998

[51] Int. Cl.⁷ ............................................. C08L 69/00
[52] U.S. Cl. ................................. 525/439; 525/444
[58] Field of Search ............................... 525/439

[56] References Cited

U.S. PATENT DOCUMENTS

| | | |
|---|---|---|
| 3,792,115 | 2/1974 | Kishikawa et al. . |
| 4,246,381 | 1/1981 | Robeson . |
| 4,379,892 | 4/1983 | Ueno et al. . |
| 5,552,463 | 9/1996 | Akkapeddi et al. . |
| 5,916,997 | 6/1999 | Webb ...................................... 528/194 |

FOREIGN PATENT DOCUMENTS

| | | |
|---|---|---|
| 3408709 | 9/1985 | Germany . |
| 201326 | 8/1989 | Japan . |

*Primary Examiner*—Patricia A. Short
*Attorney, Agent, or Firm*—S. Bruce Brown; Noreen C. Johnson

[57] ABSTRACT

Weatherability of polycarbonates, or of blends of polycarbonates with other polymers such as polyesters, is improved by incorporating therein a thermoplastic arylate polymer comprising units derived from a resorcinol or alkylresorcinol isophthalate-terephthalate. These units may be combined with units derived from a resorcinol or alkylresorcinol ester of a $C_{4-12}$ aliphatic, alicyclic or mixed aliphatic-alicyclic dicarboxylic acid, such as sebacic acid.

19 Claims, 1 Drawing Sheet

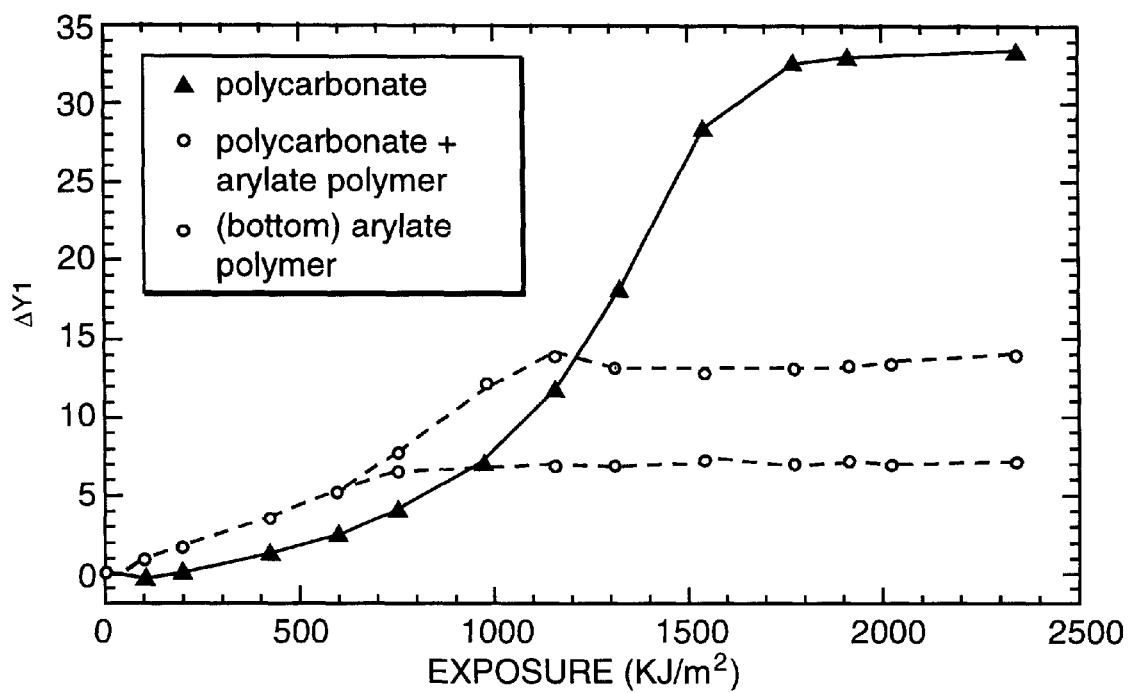

WEATHERABLE BLENDS OF POLYCARBONATES WITH ARYLATE POLYMERS

BACKGROUND OF THE INVENTION

This invention relates to resinous compositions of matter, and more specifically to resinous polycarbonate blends having improved weatherability.

Polycarbonates are a widely employed class of polymers, in part because of their excellent physical properties including high impact strength. However, their long term color instability is a problem. It causes yellowing of the polymer, detracting from its transparency and attractiveness. Loss of gloss can also be an undesirable long term phenomenon in polycarbonates and, especially, in blends of polycarbonates with polyesters such as poly(alkylene terephthalates).

Yellowing of polycarbonates is caused largely by the action of ultraviolet radiation, which is why such yellowing is frequently designated "photoyellowing". Numerous means for suppressing photoyellowing have been employed and proposed. Many of these involve incorporation in the polycarbonate of ultraviolet absorbing compounds (UVA's). For the most part, UVA's are low molecular weight compounds and they must be employed at relatively low levels, typically up to 1% by weight, to avoid degradation of the physical properties of the polymer such as impact strength and high temperature properties as reflected in heat distortion temperature.

Numerous other polymers have been blended with polycarbonates for various purposes. For example, U.S. Pat. No. 3,792,115 describes blends of polycarbonates with polyarylates derived from a varied and large selection of dihydroxy compounds such as hydroquinone, resorcinol and 2,2-bis(4-hydroxyphenyl)propane ("bisphenol A") and dicarboxylic acids such as terephthalic and isophthalic acids, said blends being characterized by improved physical properties such as impact strength and heat deformation resistance.

Other polymer blends are also described as having improved properties. U.S. Pat. No. 4,246,381, for example, describes blends of a polyarylate, which may be a bisphenol A-hydroquinone terephthalate-isophthalate, with a copolyester derived from a cyclohexanedimethanol, an alkylene glycol and an aromatic dicarboxylic acid, said blends having improved mechanical properties after exposure to ultraviolet radiation. U.S. Pat. No. 5,552,463 and Japanese Kokai 1/201,326 describe blends of poly(ethylene terephthalate) with a resorcinol isophthalate, terephthalate and/or aliphatic dicarboxylate, characterized by improved high temperature and gas barrier properties. None of these publications, however, offer any guidance on improvement of polycarbonate resistance to degradation by ultraviolet radiation and loss of gloss, hereinafter sometimes collectively designated "weatherability".

Copending, commonly owned application Ser. No. 09/030,076, now U.S. Pat. No. 5,916,997, describes weatherable "soft block" copolyesters comprising resorcinol iso/terephthalate units in combination with ester units derived from an aliphatic or alicyclic dihydroxy compound or dicarboxylic acid. There is no suggestion, however, of the use of such copolyesters in blends with polycarbonates.

SUMMARY OF THE INVENTION

The present invention is based on the discovery that certain arylate polymers can be blended into polycarbonate-containing materials to improve weatherability. The resulting blends are more resistant to photoyellowing than are corresponding blends containing other polyarylates, and also have excellent physical properties.

One aspect of the invention is resinous compositions comprising a polycarbonate in the amount of at least about 30% by weight and a minor proportion, effective to improve color stability or gloss retention, of a thermoplastic arylate polymer comprising first structural units derived from a resorcinol or alkylresorcinol isophthalate-terephthalate, optionally in combination with second structural units derived from a resorcinol or alkylresorcinol ester of a $C_{4-12}$ aliphatic, alicyclic or mixed aliphatic-alicyclic dicarboxylic acid.

Another aspect of the invention is resinous compositions comprising at least about 30% by weight of a polycarbonate and a minor proportion, effective to improve color stability or gloss retention, of a thermoplastic arylate polymer which is a polyester consisting of structural units of the formula

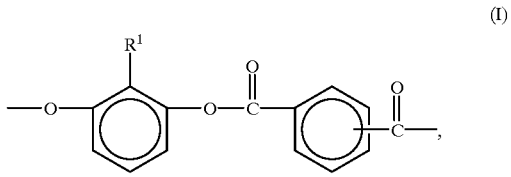

wherein $R^1$ is hydrogen or $C_{1-4}$ alkyl, optionally in combination with structural units of the formula

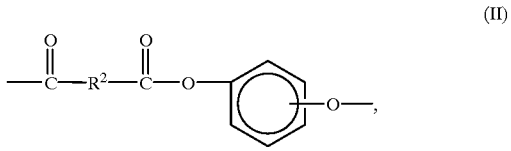

wherein $R^2$ is a divalent $C_{4-12}$ aliphatic, alicyclic or mixed aliphatic-alicyclic radical.

BRIEF DESCRIPTION OF THE DRAWING

The drawing is a graphical representation of the weathering behavior of a typical composition of the invention, in comparison with neat polycarbonate and neat arylate polymer.

DETAILED DESCRIPTION; PREFERRED EMBODIMENTS

A polycarbonate is one of the essential constituents of the compositions of the invention. Suitable polycarbonates include homo- and copolycarbonates comprising structural units of the formula

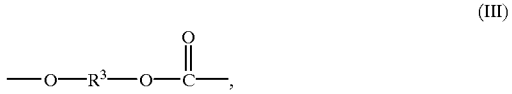

wherein $R^3$ is an organic radical. For the most part, at least about 60 percent of the total number of $R^3$ groups in the polymer are aromatic organic radicals and the balance thereof are aliphatic, alicyclic, or aromatic radicals. More preferably, $R^3$ is an aromatic organic radical and still more preferably a radical of the formula $$—A^1—Y—A^2—\tag{IV}$$

wherein each $A^1$ and $A^2$ is a monocyclic divalent aryl radical and Y is a bridging radical in which one or two carbon atoms separate $A^1$ and $A^2$. For example, $A^1$ and $A^2$ typically represent unsubstituted phenylene or substituted derivatives thereof. The bridging radical Y is most often a hydrocarbon group and particularly a saturated group such as methylene, cyclohexylidene or isopropylidene. The most preferred polycarbonates are bisphenol A polycarbonates, in which each of $A^1$ and $A^2$ is p-phenylene and Y is isopropylidene. Preferably, the weight average molecular weight of the initial polycarbonate composition ranges from about 5,000 to about 100,000; more preferably, from about 25,000 to about 65,000.

The polycarbonate may also be a copolyestercarbonate. Such polymers contain, in addition to the carbonate units of formula III, ester units typically containing $R^3$ radicals linked to aromatic dicarboxylate groups such as isophthalate and/or terephthalate.

The second essential constituent of the compositions of the invention is designated "arylate polymer" to distinguish it from polyarylates, which contain exclusively aromatic moieties. The arylate polymer may be a polyarylate, but it is also contemplated for it to contain "soft block" aliphatic or alicyclic moieties.

The units of formula I are structurally identical to certain units which may be present in polyarylates. They contain a resorcinol or alkylresorcinol moiety in which any alkyl groups are $C_{1-4}$ alkyl; i.e., methyl, ethyl, propyl or butyl. They are preferably primary or secondary groups, with methyl being more preferred. The most preferred moieties are resorcinol moieties, in which $R^1$ is hydrogen. Said resorcinol moieties are bound to isophthalate and/or terephthalate moieties.

In the optional soft block units of formula II, resorcinol or alkylresorcinol moieties are again present in ester-forming combination with $R^2$ which is a divalent $C_{4-12}$ aliphatic, alicyclic or mixed aliphatic-alicyclic radical. It is preferably aliphatic and especially $C_{8-12}$ straight chain aliphatic.

It is usually found that the arylate polymers most easily prepared, especially by interfacial methods, consist of units of formula I and especially combinations of resorcinol isophthalate and terephthalate units in a molar ratio in the range of about 0.25–4.0:1, preferably about 0.9–1.1:1. When that is the case, the presence of soft block units of formula II is usually unnecessary. If the ratio of units of formula I is outside this range, and especially when they are exclusively iso- or terephthalate, the presence of soft block units may be preferred to facilitate interfacial preparation. A particularly preferred arylate polymer containing soft block units is one consisting of resorcinol isophthalate and resorcinol sebacate units in a molar ratio between 8.5:1.5 and 9.5:0.5.

Upon exposure of the compositions of the invention to radiation in the visible and/or ultraviolet regions of the spectrum, it is believed that the units of formula I undergo a photo-Fries rearrangement with migration of at least one carboxy group to the resorcinol ring. The resulting product is a polymer having hydroxybenzophenone moieties, which are known to be active as UVA's. However, the invention is not dependent on this or any other theory of operation.

Arylate polymers useful in the compositions of this invention may be prepared by conventional esterification reactions which may be conducted interfacially, in the melt or under solid state conditions, all of which are known in the art. Typical interfacial preparation conditions are described in the aforementioned copending application Ser. No. 09/030,076, the disclosure of which is incorporated by reference herein.

The preparation of arylate polymers is also illustrated by the following examples.

EXAMPLE 1

To a 1-l reactor equipped with a mechanical stirrer, nitrogen inlet, reflux condenser and two pressure equilibration addition funnels was added resorcinol (11.011 g, 100 mmol), tetrabutylammonium bromide (1.611 g, 5 mmol), resorcinol monobenzoate (0.535 g, 2.5 mmol) as an endcapping agent and degassed methylene chloride (150 ml). The reactor was blanketed with nitrogen. One of the addition funnels was charged with sodium hydroxide solution (8.05 g, 201 mmol in 50 ml degassed water). To the second addition funnel was added isophthaloyl chloride (10.151 g, 50 mmol), terephthaloyl chloride (10.151 g, 50 mmol) and methylene chloride (100 ml) and the resulting solution was degassed for 5 minutes. The cold (20° C.) sodium hydroxide solution was added to the contents of the reactor with moderate stirring and at a rate which prevented refluxing of the solvent. A translucent two-phase mixture formed. The mixture of acid chlorides was then added within two minutes while cooling so as to maintain a gentle reflux while preventing any azeotrope from contaminating the acid chloride solution. Within 5 minutes a thick polymer solution formed. The reaction mixture was stirred at 30–35° C. for 45 minutes, during which time the pH of the aqueous phase was kept below 10. The arylate polymer was isolated by precipitation into methanol; it had a weight average molecular weight of 51,000, as determined by gel permeation chromatography relative to polystyrene.

EXAMPLE 2

To a 1-l 4-necked flask equipped with a mechanical stirrer, nitrogen inlet, reflux condenser and two pressure equilibration addition funnels was added cetyltrimethylammonium bromide (1.82 g, 5.00 mmol), freshly distilled resorcinol (11.01 g, 100 mmol), p-cumylphenol (212 mg, 1 mole percent) as an endcapping agent and degassed methylene chloride (150 ml). The flask was blanketed with nitrogen. One of the addition funnels was charged with sodium hydroxide pellets (8.04 g, 200 mmol) and water (50 ml). Nitrogen was bubbled through the solution for 5 minutes. To the second addition funnel was added isophthaloyl chloride (18.27 g, 90 mmol), sebacoyl chloride (2.41 g, 10.08 mmol) and methylene chloride (100 ml) and the resulting solution was degassed for 5 minutes. The cold (20° C.) sodium hydroxide solution was added to the contents of the flask under moderate stirring and at a rate which prevented refluxing of the solvent. A white, translucent emulsion formed. The mixture of acid chlorides was then added at such a rate as to maintain a gentle reflux while preventing any azeotrope from contaminating the acid chloride solution. The white emulsion was stirred at room temperature for one hour and the polymer thus formed was precipitated in cold (20° C.) methanol, washed with water and methanol and dried in vacuum to give the desired arylate polymer (26.6 g, 95% yield) as a white, fibrous material.

Upon analysis by gel permeation chromatography, the arylate polymer showed a bimodal distribution with a peak Mw of about 60,000 and a second peak centered at about 1,200. A polymer exhibiting a unimodal Mw distribution was obtained upon heating the original material for 5 minutes at 250° C.

Polymers having Mw values up to about 200,000 could be obtained by decreasing the amount of endcapping agent to as low as 0.25 mole percent.

EXAMPLE 3

To a 100-ml 3-necked flask equipped with a mechanical stirrer, nitrogen inlet and reflux condenser/Dean-Stark apparatus were added bis(o-chlorophenyl) isophthalate (30.97 g, 80 mmol), bis(o-chlorophenyl) sebacate (8.46 g, 20 mmol), freshly distilled resorcinol (11.01 g, 100 mmol) and tetramethylammonium tetraphenylborate (50.4 mg, 100 ppm wt.). The flask was blanketed with dry nitrogen and the contents were maintained at 250° C. for one hour, during which time vigorous distillation of chlorophenol occurred. The temperature was then gradually raised to 280° C. over a period of three hours while passing a slow stream of nitrogen through. The molten polymer was quickly poured onto a polytetrafluoroethylene-coated metal sheet to give the desired arylate polymer as a translucent light amber material.

The compositions of the invention contain polycarbonate in the amount of at least about 30%, preferably about 60–90%, and arylate polymer in minor proportion effective to improve color stability or gloss retention, generally about 5–30%, both by weight based on total resinous constituents. Other polymers, especially polyesters and addition polymers, may also be present in minor proportion. Typical polyesters are poly(alkylene arenedioates) such as poly (ethylene terephthalate) and poly(1,4-butylene terephthalate) and the corresponding isophthalates, which may constitute up to about 35% on the same basis. Typical addition polymers are ABS (acrylonitrile-butadiene-styrene) copolymers, ASA (acrylonitrile-styrene-alkyl acrylate) polymers and other acrylate polymers.

In addition, other conventional materials such as fillers, dyes, pigments, thermal stabilizers, impact modifiers, antistatic agents and processing aids may be present in art-recognized amounts. Descriptions of such materials are found in Gachter et al., *Plastics Additives Handbook*, 4th Edition (1993), incorporated herein by reference.

A preferred embodiment of the invention includes compositions containing fillers and/or pigments. Illustrative extending and reinforcing fillers and pigments are silicates, titanium dioxide, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cork, cotton and synthetic fibers. Ester interchange suppressants such as phosphorous acid, phosphoric acid, phosphites and phosphates may also be incorporated.

The compositions of the invention may be blended by art-recognized methods. These typically include dry blending followed by melt processing, often by extrusion. Articles may then be produced from said compositions by molding, sheet fabrication and the like.

As previously noted, a principal feature of the compositions of the invention is their weatherability, which is superior to that of similar blends containing commercially available, structurally similar polyarylates such as bisphenol A isophthalate-terephthalate, commercially available under the trade name ARDEL. Further, the physical properties of the compositions of the invention are excellent, generally comparable to those of neat polycarbonate.

The invention is illustrated by the following examples. All parts and percentages are by weight unless otherwise specified. Molecular weights are weight average and were determined by gel permeation chromatography relative to polystyrene.

EXAMPLE 4

A blend of 80 parts of a commercial bisphenol A polycarbonate having a molecular weight of 48,500, 20 parts of a soft block arylate polymer similar to that of Example 2 but having a molecular weight of 44,500 and an ester interchange suppressing amount of phosphorous acid was prepared by dry blending in a bag followed by extrusion at temperatures in the range of 220–280° C.

In an accelerated weathering test, plaques were fabricated by injection molding the polycarbonate-arylate polymer blend and exposed in an Atlas Ci35a xenon arc Weatherometer equipped with borosilicate inner and outer filters. The light cycle was 160 minutes long at an irradiance of 0.77 W/m$^2$ at 340 nm with a black panel temperature of 70° C. and a dry bulb temperature of 45° C. The dark cycle was 20 minutes long with a water spray during the latter 15 minutes. Exposure was measured in total kJ/m$^2$ of irradiance at 340 nm. The transmission color was determined as the yellowness index (YI), measured according to ASTM procedure D 1925 on a Gardner XL-835 colorimeter.

The results are shown in the drawing, in combination with neat polycarbonate and neat arylate polymer as controls. It is apparent that the composition of the invention was significantly superior in weatherability to the neat polycarbonate.

EXAMPLE 5

Various blends of the polycarbonate of Example 4 with the arylate polymer of Example 1 and 2 parts of titanium dioxide per 100 parts of total resinous constituents (as a pigment) were prepared as described in the latter example. They were evaluated for weatherability in a procedure similar to that of Example 4, except that the yellowness index was measured when an exposure of 933 kJ/m$^2$ had been attained. They were also evaluated for gloss retention, using a Micro TRI gloss meter manufactured by Byk-Gardner and measuring specular gloss at a 60° viewing angle.

The results are given in Table I, in combination with two controls: neat polycarbonate and a similarly prepared blend of polycarbonate with 10% of a bisphenol A iso/terephthalate containing 50 mole percent isophthalate units.

TABLE I

| Blend | YI | Loss of gloss, % |
| --- | --- | --- |
| 5% arylate polymer | 18.9 | 81 |
| 10% arylate polymer | 16.3 | 80 |
| 20% arylate polymer | 13.5 | 74 |
| Neat polycarbonate | 22.9 | 86 |
| 10% bisphenol A iso/terephthalate | 21.8 | 88.1 |

It is apparent that the compositions of the invention are superior to both controls in weatherability.

EXAMPLE 6

Following the procedure of Example 5, blends containing 30% poly(1,4-butylene terephthalate) ("PBT") and the specified amount of the arylate polymer of Example 1, with the balance being the polycarbonate of Example 4 and titanium dioxide (2 phr), were evaluated at an exposure to 600 kJ/m$^2$. The results are given in Table II.

TABLE II

| Blend | YI | Loss of gloss, % |
|---|---|---|
| 10% arylate polymer | 9.7 | 51 |
| 20% arylate polymer | 8.5 | 17 |
| Neat polycarbonate/PBT | 15.2 | 74 |
| 10% bisphenol A iso/terephthalate | 17.6 | 79 |

The results are thus similar to those obtained with polycarbonate blends not containing PBT.

Physical properties of the compositions of the invention, with particular reference to falling dart (Dynatup) impact strengths (ASTM procedure D3763 or variants thereof are, as a rule, comparable to those of the neat polycarbonates.

What is claimed is:

1. A resinous composition comprising a polycarbonate in the amount of at least about 30% by weight and a minor proportion, effective to improve color stability or gloss retention, of a thermoplastic arylate polymer consisting of structural units derived from a resorcinol or alkylresorcinol isophthalate-terephthalate, wherein the isophthalate and terephthalate units are present in a molar ratio in the range of about 0.9–1.1:1.

2. A composition according to claim 1 wherein the polycarbonate is a bisphenol A polycarbonate.

3. A composition according to claim 1 further comprising at least one filler or pigment.

4. An article having improved weatherability made from the composition of claim 1.

5. A resinous composition comprising at least about 30% by weight of a polycarbonate and a minor proportion, effective to improve color stability or gloss retention, of a thermoplastic arylate polymer which is a polyester consisting of structural units derived from resorcinol isophthalate-terephthalate of the formula

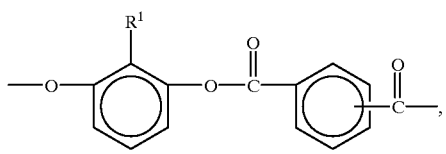

(I)

wherein $R^1$ is hydrogen or $C_{1-4}$ alkyl, and the isophthalate and terephthalate units are present in a molar ratio in the range of about 0.9–1.1:1.

6. A composition according to claim 5 wherein the polycarbonate is a bisphenol A polycarbonate.

7. A composition according to claim 5 further comprising at least one filler or pigment.

8. A composition according to claim 5 further comprising a minor proportion of another polymer which is a polyester or addition polymer.

9. A composition according to claim 8 wherein the other polymer is a polyester.

10. A composition according to claim 9 wherein the polyester is a poly(alkylene arenedioate).

11. An article having improved weatherability made from the composition of claim 5.

12. A resinous composition comprising at least about 30% by weight of a polycarbonate and a minor proportion, effective to improve color stability or gloss retention, of a thermoplastic arylate polymer consisting of first structural units derived from a resorcinol or alkylresorcinol isophthalate, in combination with second structural units derived from a resorcinol or alkylresorcinol ester of a $C_{8-12}$ straight chain aliphatic dicarboxylic acid, wherein said arylate polymer has a ratio of first to second structural units between 8.5:1.5 and 9.5:0.5.

13. A composition according to claim 12 wherein said second structural units are derived from resorcinol sebacate.

14. A composition according to claim 12 further comprising at least one filler or pigment.

15. A composition according to claim 12 further comprising a minor proportion of another polymer which is a polyester or addition polymer.

16. A composition according to claim 15 wherein the other polymer is a polyester.

17. A composition according to claim 16 wherein the polyester is a poly(alkylene arenedioate).

18. An article having improved weatherability made from the composition of claim 12.

19. A resinous composition comprising at least about 30% by weight of a polycarbonate and a minor proportion, effective to improve color stability or gloss retention, of a thermoplastic arylate polymer consisting of first structural units derived from a resorcinol isophthalate, in combination with second structural units derived from a resorcinol sebacate, wherein said arylate polymer has a ratio of first to second structural units between 8.5:1.5 and 9.5:0.5.

* * * * *